(12) United States Patent
Gutjahr

(10) Patent No.: US 7,499,984 B2
(45) Date of Patent: Mar. 3, 2009

(54) STATUS-MESSAGE MAPPING

(75) Inventor: Bernd Gutjahr, Ostelheim (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1073 days.

(21) Appl. No.: 10/806,431

(22) Filed: Mar. 23, 2004

(65) Prior Publication Data
US 2005/0216573 A1 Sep. 29, 2005

(51) Int. Cl.
G06F 15/16 (2006.01)

(52) U.S. Cl. .............. 709/219; 709/201; 709/202; 709/246; 709/223; 714/2; 714/47; 714/48; 714/49; 370/329; 370/328

(58) Field of Classification Search .............. 709/219, 709/223, 246, 201–203; 705/36
See application file for complete search history.

(56) References Cited

U.S. PATENT DOCUMENTS

| | | | |
|---|---|---|---|
| 7,027,808 B2 * | 4/2006 | Wesby | 455/419 |
| 7,143,139 B2 * | 11/2006 | Burbeck et al. | 709/206 |
| 2002/0138638 A1 | 9/2002 | Hermann et al. | |
| 2002/0143788 A1 | 10/2002 | Hermann et al. | |
| 2005/0222933 A1 * | 10/2005 | Wesby | 705/36 |

OTHER PUBLICATIONS hpOpenView Quick Reference Guide, Feb. 2003.
H.-G. Hegering et al.: Integrated Management of Networked Systems, 1998, pp. 121-126 and p. 313.
R. Sedgewick: Algorithms in C, 1990, pp. 415-449.
Elmasri et al., *Fundamentals of Database Systems*, Third edition, 2000, pp. 50, 59, and 60.

* cited by examiner

*Primary Examiner*—Jude J Jean Gilles

(57) ABSTRACT

A method of mapping status messages of monitored objects to service elements in an IT-infrastructure-management system is provided. The service elements and their dependencies being represented by an element graph having directed links between service elements, thereby defining higher-level and lower-level service elements. The method includes directing a status message to at least one higher-level service element; ascertaining, at the higher-level service element, whether the status message pertains to a lower-level service element connected with the higher-level service element; downwardly propagating of the status message to said lower-level service element in response to a positive outcome in the action of ascertaining.

21 Claims, 7 Drawing Sheets

STATUS-MESSAGE MAPPING

FIELD OF THE INVENTION

The present invention relates generally to status-message mapping, and for example, to a method, an IT-infrastructure-management server, a computer program product and a propagated signal representing a program for mapping status messages of monitored objects to service elements in an IT-infrastructure-management system.

BACKGROUND OF THE INVENTION

Due to the increasing complexity of modern information-technological (IT) networks (computer networks and telecommunication networks), integrated network management systems (also called "management platforms") have become an important tool for the operation of IT networks. For example, Hewlett-Packard offers such a management platform under the name "hp OpenView" (see, for example, hp OpenView Quick Reference Guide, February 2003), and a structure of a typical management platform is, for example, shown in H.-G. Hegering et al.: Integrated Management of Networked Systems, 1998, pp. 313). Conventionally, one task of "network management" has been the monitoring of the status, performance or availability of network elements and the provision of monitoring results, for example, to a network operator. Typically, network monitoring includes an alarm functionality which alerts the operator when an incident occurs which requires attention, for example, a fault, an impending fault, or a decline of performance or availability of a network element. A network element's status message on which such an alarm is based may either be received from a managed network element in response to (e.g. periodical) requests from a management server, or it may be sent asynchronously by the managed network element to the management server. Typically (but not necessarily) a network management system not only provides a flow of information from managed network elements to the management server (and, e.g. to the network operator), but also enables managed network elements to be manipulated, e.g. by the network operator or, automatically, by a network management process. "Manipulating" may, for example, comprise configuring network elements or changing their existing configuration, starting and stopping processes in network elements, allocating memory to them, etc. Known management architectures are, for example, the OSI management architecture (which is mainly used in the Telecommunications Management Network) and the Internet management architecture which uses SNMP (Simple Network Management Protocol) as a communication model (see, for example, Hegering, pp. 121-196).

In simple network management systems, only hardware devices (such as network interconnect devices and end devices) are managed. However, what an operator of a network or client of a network provider is typically most interested in is not the functioning of the individual hardware devices and network connections, but rather the functioning of systems (i.e. combinations of several hardware components and an operating system used to utilize the hardware), applications and services provided by the network and its devices. Therefore, in more elaborate management systems, systems, applications and services are also managed (wherein "managed" often just means "monitored"). An application is typically an assembly of sub-applications on which it depends, which, in turn, depend on hardware resources (mostly on a multiplicity of hardware resources) and network connections. A service is a customer-based or user-based functionality which, for example, forms a part of a business process. It is typically composed of several application, operating system, hardware and communication components and normally has an interface to the service receiver. Hence a service depends on service-sub-functionalities, which, in turn, depend on hardware and communication resources (mostly on a multiplicity of such resources). Usually, an application (such as an enterprise resource planning (ERP) application, an e-mail server application, a web server application etc.) may be considered as a "service", but the term "service" may also refer to higher-level objects which may, for example, be business-related (such as objects representing the different business fields of an enterprise). All these objects (hardware devices, systems, sub-applications/sub-services, applications/services) may be managed objects of a network management system; they are all denoted as "service elements" hereinafter.

Examples of network management systems in which service elements are managed (monitored) are described in US 2002/0138638 A1 and US 2002/0143788 A1.

Typically, there are dependencies between service elements: a fault of a hardware device will affect a sub-application (or a sub-service) which relies on this hardware device. In turn, a fault of a sub-application (or sub-service) will affect an application (or a service) relying on it. Such dependencies can be thought of as (virtual) links between service elements. Typically, these links are directed links since, for example, a hard-disk failure will affect a database application relying on this hard disk, but a failure of the (superordinate) database service will generally not affect the functionality of the (subordinate) hard disk. Similarly, the failure of a database management system (DBMS) (which may be considered as a "sub-application" here) will affect an ERP application (which may be considered as an "application") relying on the DBMS, but the (subordinate) DBMS will generally not be affected by a failure of the (superordinate) ERP application. The service elements are thus in relationships which may be modeled by an element graph having links (or edges) between service elements. The nodes of the graph represent the service elements. The links represent the dependencies, and the direction of a link may represent the direction of dependency. Thereby, higher-level and lower-level service elements are defined (wherein, of course, there may be more than two levels, as indicated by the example given above). In simple cases, such a graph will be tree-like (also called a "hierarchy"), with the root of the tree at, or above, the highest-level service element or elements. An example of a tree-like service-element graph is shown in FIG. 4 of US 2002/0138638 A1. Generally, the element graph may have a non-tree-like structure (it may, for example, be a "lattice"), if more than one higher-level service depend on a lower-level service, i.e. it may have cycles. An example of such a non-tree-like service element graph is shown in FIG. 5 of US 2002/0138638 A1.

In network management systems, there are generally two different kinds of status (or monitoring) messages of monitored objects: (i) asynchronous messages which are typically sent by management agents assigned to the monitored object to a management server, such as an SNMP trap in Internet management (see Hegering, pp. 171-179) or a CMIP notification in OSI management (see Hegering, pp. 134-139); such asynchronous messages are sent by the management agents without request, e.g. triggered by an event detected by the agent in the monitored object; (ii) synchronous status messages, i.e. responses of management agents returned in response to status requests, e.g. from a management server. Again, the message may be an SNMP response (issued in response to an SNMP request) in Internet management or a CMIP response (issued in response to a CMIP GET operation) in OSI management. Both asynchronous and synchronous messages are generically denoted as "status messages" hereinafter.

In contrast to most of today's network interconnect devices many of the applications available on the market are not (or, at least, not completely) instrumented for application management; in particular, they are often not enabled to provide information about their status to a management system via an agent, as interconnect devices can. Furthermore, certain high-level services may be virtual or logical elements which are not made up of a single application or resource, but of a (virtual) assembly of several applications and/or resources. For example, such a high-level service element might be a "credit department" of a bank, which relies on several applications. Typically, such virtual high-level services are not objects instrumented for management, either; in particular, they will not be able to send status messages to a management system. Therefore, the current status of such uninstrumented applications or high-level services is often not directly determined, but is indirectly concluded from the current status of lower-level elements on which it depends. For example, a failure of a network interconnect device may have an impact on applications and services on a server, for example a DNS server which can no longer be reached due to the failure, which, in turn, may influence the status of higher-level applications and services relying on it. In order to perform such IT-infrastructure management based on indirect conclusion, a representation of the service-element graph is established in the IT management system, and the (virtual) status of at least some of the service elements is affected by status messages received from other service elements on which they depend.

In an IT-infrastructure-management system with such a virtual service-element graph, as described in US 2002/0138638 A1, status messages from monitored objects are directly mapped to the service elements representing the respective monitored objects. Virtual service elements may depend on the status of the respective monitored object and be affected by a status change of it. As a consequence of a receipt of such a status-change-indicating message at the service element representing such a monitored object, the status of the service element may be changed and the status change (not the status message itself) may be propagated upwardly to also influence the status of the higher-level service elements. For example, if a certain virtual service element depends on the availability of a certain hardware resource, directing a status message indicating a failure of this resource to the representation of this resource in the service-element graph and upward propagating the status change may cause the status of the superordinate service element to change from a "normal" state to a "critical" state which indicates that the virtual service element is not (fully) available.

In the prior art, two ways to map status messages to service elements are known: (i) a status message is mapped to a service element at the lowest hierarchical level, typically to a representation of the monitored object from which the status message originates. The status message may influence the status of the lowest-level service element to which it is mapped. This status change (not the status message itself) is then propagated upwardly in the service-element graph according to predefined rules. An example of such a status-upward propagation is illustrated at the left-hand side of FIG. 6 of US 2002/0138638 A1; (ii) if a status message does not specifically refer to a monitored device, but to a higher-level service element, it may be immediately directed to the higher-level service element, and may directly influence its status. This may happen if an application is "instrumented" for management. An example of this is illustrated at the right-hand side of FIG. 6 of US 2002/0138638 A1. In both cases, the service elements of the service-element graph are identifiable by a unique service-element identifier; and each status message carries with it a service-element identifier referencing the service element for which the message is destined.

SUMMARY OF THE INVENTION

A first aspect of the invention is directed to a method of mapping status messages of monitored objects to service elements in an IT-infrastructure-management system. In the method according to the first aspect, the service elements and their dependencies are represented by an element graph having directed links between service elements, thereby defining higher-level and lower-level service elements. The method comprises: directing a status message to at least one higher-level service element; ascertaining, at the higher-level service element, whether the status message pertains to a lower-level service element connected with the higher-level service element; downwardly propagating of the status message to said lower-level service element in response to a positive outcome in said ascertaining.

According to another aspect, a method is provided of mapping status messages of monitored objects to service elements in an IT-infrastructure-management system. The service elements and their dependencies are represented by an element graph having directed links between service elements, thereby defining higher-level and lower-level service elements. The method comprises: analyzing a status message of a monitored object, and adding attributes to the status message related to information contained in the status message, directing the status message to at least one higher-level service element; ascertaining, at the higher-level service element, on the basis of at least one of the attributes, whether the status message pertains to a lower-level service element connected with the higher-level service element; downwardly propagating of the status message to said lower-level service element in response to a positive outcome in said ascertaining.

According to another aspect, an IT-infrastructure-management server is provided arranged to map status messages of monitored objects of the IT infrastructure to service elements which are represented in the server in an element graph having directed links connecting service elements, thereby defining higher-level and lower-level service elements. The server is programmed to: direct a status message to at least one higher-level service element; ascertain, at the higher-level service element, whether the status message pertains to a lower-level service element connected with the higher-level service element; propagate downwardly the status message to said lower-level service element in response to a positive outcome in said ascertaining.

According to another aspect, an IT-infrastructure-management server is provided arranged to map status messages of monitored objects of the IT infrastructure to service elements which are represented in the server in an element graph having directed links connecting service elements, thereby defining higher-level and lower-level service elements. The server is programmed to: analyze a status message of a monitored object, and add attributes to the status message related to information contained in the status message, direct the status message to at least one higher-level service element; ascertain, at the higher-level service element, on the basis of at least one of the attributes, whether the status message pertains to a lower-level service element connected with the higher-level service element; propagate downwardly the status message to said lower-level service element in response to a positive outcome in said ascertaining.

According to another aspect, a computer program product is provided. It comprises a machine-readable medium with program code stored on it. The program code, when executed on a computer system, carries out a method of mapping status messages of monitored objects to service elements in an IT-infrastructure-management system. The service elements and their dependencies are represented by an element graph having directed links between service elements, thereby defining higher-level and lower-level service elements. The program code is arranged to: direct a status message to at least one higher-level service element; ascertain, at the higher-level service element, whether the status message pertains to a lower-level service element connected with the higher-level service element; downwardly propagating the status message to said lower-level service element in response to a positive outcome in said ascertaining.

According to another aspect, a computer program product is provided. It comprises a machine-readable medium with program code stored on it. The program code, when executed on a computer system, carries out a method of mapping status messages of monitored objects to service elements in an IT-infrastructure-management system. The service elements and their dependencies are represented by an element graph having directed links between service elements, thereby defining higher-level and lower-level service elements. The program code is arranged to: analyze a status message of a monitored object, and add attributes to the status message related to information contained in the status message, direct the status message to at least one higher-level service element; ascertain, at the higher-level service element, on the basis of at least one of the attributes, whether the status message pertains to a lower-level service element connected with the higher-level service element; propagate downwardly the status message to said lower-level service element in response to a positive outcome in said ascertaining.

According to another aspect, a propagated signal carried on an electromagnetic waveform is provided. The signal comprises a representation of program code. The program code, when executed on a computer system, carries out a method of mapping status messages of monitored objects to service elements in an IT-infrastructure-management system. The service elements and their dependencies are represented by an element graph having directed links between service elements, thereby defining higher-level and lower-level service elements. The program code is arranged to: direct a status message to at least one higher-level service element; ascertain, at the higher-level service element, whether the status message pertains to a lower-level service element connected with the higher-level service element; downwardly propagating the status message to said lower-level service element in response to a positive outcome in said ascertaining.

According to another aspect, a propagated signal carried on an electromagnetic waveform is provided. The signal comprises a representation of program code. The program code, when executed on a computer system, carries out a method of mapping status messages of monitored objects to service elements in an IT-infrastructure-management system. The service elements and their dependencies are represented by an element graph having directed links between service elements, thereby defining higher-level and lower-level service elements. The program code is arranged to: analyze a status message of a monitored object, and add attributes to the status message related to information contained in the status message, direct the status message to at least one higher-level service element; ascertain, at the higher-level service element, on the basis of at least one of the attributes, whether the status message pertains to a lower-level service element connected with the higher-level service element; propagate downwardly the status message to said lower-level service element in response to a positive outcome in said ascertaining.

Other features are inherent in the methods and products disclosed or will become apparent to those skilled in the art from the following detailed description of embodiments and its accompanying drawings.

DESCRIPTION OF THE DRAWINGS

Embodiments of the invention will now be described, by way of example, and with reference to the accompanying drawings, in which.

DESCRIPTION OF THE PREFERRED EMBODIMENTS

Figure 1:
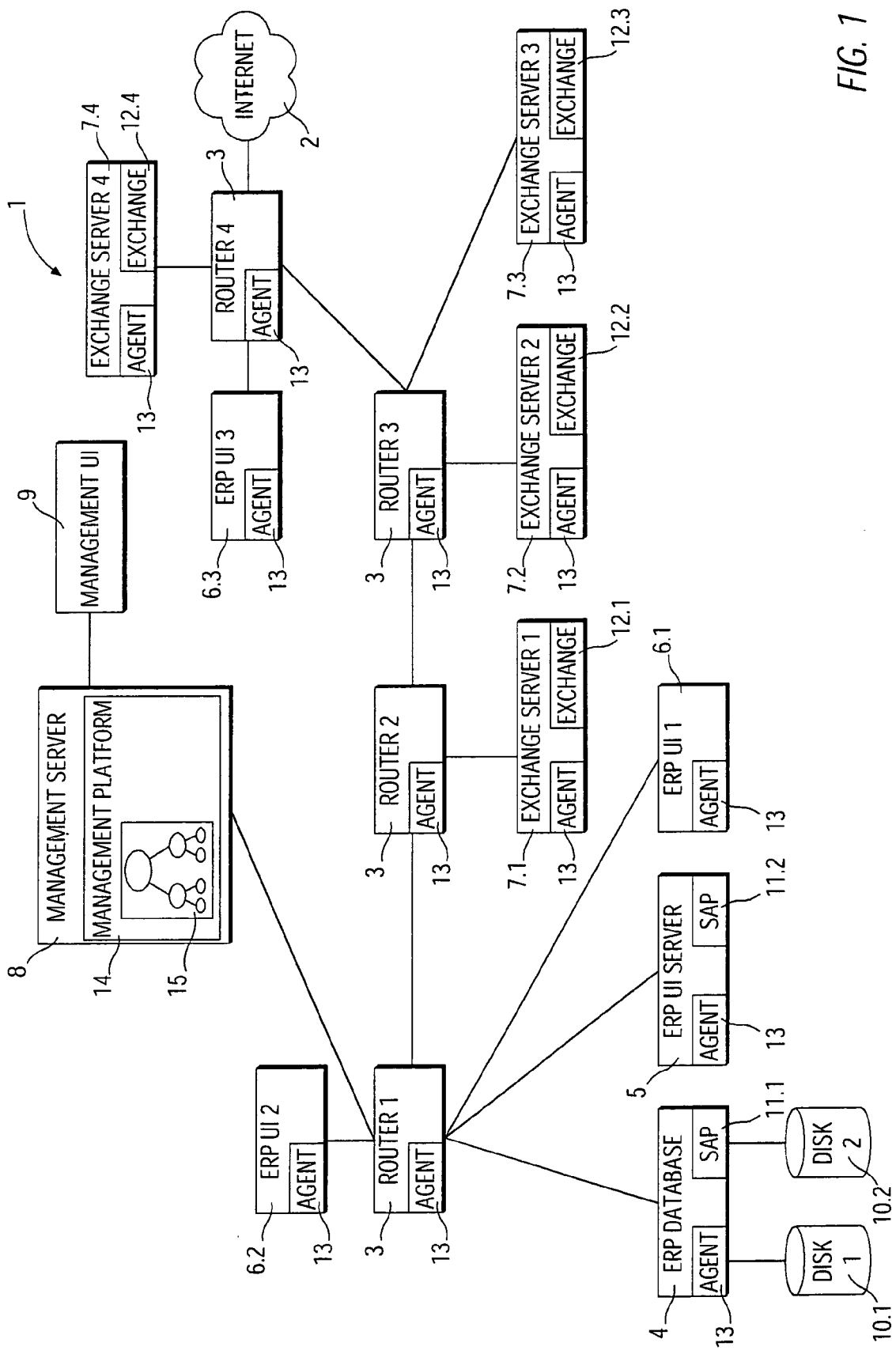
FIG. 1 illustrates an exemplary embodiment of a managed IT infrastructure including a management server.

FIG. 1 illustrates an exemplary managed IT network. Before proceeding further with the detailed description of FIG. 1, however, a few items of the embodiments will be discussed.

In the disclosed embodiments, not only physical devices (such as network interconnect devices and end devices), but also "logical" objects such as system applications and services are managed. As already mentioned at the outset, a system is typically a combination of several hardware components and an operating system used to utilize the hardware. An application is typically an assembly of sub-applications on which it depends, which, in turn, depend on hardware resources or systems. A service is typically a customer-based or user-based functionality which, for example, forms part of a business process. It is typically composed of several applications, operating system, hardware and communication components. Hence a service depends on service-sub-functionalities, which, in turn, depend on hardware and communication resources. Usually, an application (such as an ERP planning application, an e-mail server application, a web server application etc.) may be considered as a "service", but the term "service" may also refer to higher-level objects which may, for example, be business-related (such as objects representing the different business fields of an enterprise). All these physical objects (hardware devices, network connections) and logical objects (sub-applications/sub-services, applications/services) may be managed objects of an IT-infrastructure-management system; they are all denoted as "service elements" hereinafter.

Depending on the actual physical and logical topology of the IT infrastructure managed, there are dependencies between service elements: a fault of a hardware device will affect a sub-application (or a sub-service) which relies on this hardware device. In turn, a fault of a sub-application (or sub-service) will affect an application (or a service) relying on it. Such dependencies, or precedence relationships, can be thought of as (virtual or logical) links between service elements. Typically, these links are directed links since, for example, a hard-disk failure will affect a DBMS relying on this hard disk, but a failure of the superordinate DBMS will generally not affect the functionality of the subordinate hard disk. Similarly, the failure of a DBMS (which may be considered as a "sub-application" here) will affect an ERP application (which may be considered as an "application") relying on the DBMS, but the subordinate DBMS will generally not be affected by a failure of the superordinate ERP application. The service elements are thus related to one another according to a virtual service-element lattice which defines links connecting the service elements; the links are directed to represent the dependency of the connected service elements. Thereby, higher-level and lower-level service elements are defined (wherein, of course, there may be more than two levels, as indicated by the example given above). The service element lattice is also called "the service model".

Typically, many higher-level service elements are not enabled (or "instrumented") to provide the management system with information about their status. Consequently, the current status of such service elements cannot (or not completely) be directly determined, but only indirectly inferred from the current status of other (mostly lower-level) elements on which they depend. In order to include virtual service elements and non-instrumented service elements in the management process and to perform said status inference, the service-element lattice is represented in a memory of the IT management system.

The service model can be described by a directed graph. For example the nodes of the graph represent the service elements, and its edges represent the links connecting the service elements, wherein their direction represents the dependency relationship between them. In simple cases, such a graph will be tree-like (i.e. a hierarchy), with the root of the graph at, or above, the highest-level service element or elements. Generally, the graph may have a non-tree-like structure (i.e. it may have cycles), if more than one higher-level service depend on one and the same lower-level service. However, the orientation of the directed links is such that the graph has no directed cycles since, typically, a service element, does not, directly or indirectly, affect itself. A representation of the graph which can be easily processed in the computer, for example, is the so-called adjacency-list representation or the adjacency-matrix representation (see, for example, R. Sedgewick: Algorithms in C, 1990, pp. 415 to 449).

As will be explained in more detail below, in some embodiments with only one highest-level element (which may only be the root of the graph, but need not represent a particular service) the status messages are initially directed to the highest-level element. In other embodiments with several highest-level service elements, all the status messages may initially be directed to all these highest-level service elements in parallel. The root element or the several highest-level elements form one or more "entry points" for status messages. The links in the graph and their directions are such that all managed service elements represented in the graph are reachable by downward propagation from the entry point, or, in the case of more than one entry point, from the combination of all entry points. "Downwardly propagating" means processing the graph represented in the computer; if the direction of the links is chosen as the direction opposite to the direction of dependency (which goes from bottom to top), the graph is processed along the links in the link direction. In principle, the direction of the links may also be chosen in the dependency direction; the graph is then processed in the direction opposite to the link direction.

In the embodiments, there may be two different kinds of status (or monitoring) messages of monitored objects: (i) asynchronous messages which are typically sent by management agents assigned to the monitored objects to a management server, such as an SNMP trap or a CMIP notification; such asynchronous messages are sent by the management agents without request, e.g. triggered by an event detected by the agent in the monitored object; (ii) synchronous status messages, i.e. responses of management agents returned in response to status requests, e.g. from a management server. The message may be an SNMP response (issued in response to an SNMP request), a CMIP response (issued in response to a CMIP GET operation). Both asynchronous and synchronous messages are generically denoted as "status messages" hereinafter.

As mentioned above, all the status messages are initially directed to the entry point or points of the service element graph. If the graph has been entered at such an entry point (which may depend on a "node condition") it is ascertained whether the respective status message pertains to a lower-level service element connected with the "entry node" considered, as will be explained below. If the answer is positive, the status message is downwardly propagated to said lower-level service element.

Depending on the actual service-element structure, the service elements will generally be arranged in more than one level. The actions of ascertaining and downwardly propagating are then repeatedly carried out downwardly from level to level.

In some of the embodiments, conditions are associated (i) with links connecting the higher-level service elements with the next lower-level service elements; and/or (ii) with the service elements. The first-mentioned conditions are called "edge conditions" since the links they are associated with are edges of the service-element graph. The second-mentioned conditions are called "node conditions" since the service elements they are associated with are nodes of the graph. In the graph representation in the computer, the edge and node conditions are extra information associated with the edges and nodes. The edge and node conditions may, for example, be directly associated with their links and edges, or indirectly by associating references with the links and edges pointing to the link and edge conditions. The edge conditions, or references to the edge conditions may, for example, be put in auxiliary arrays indexed by edge number, or in adjacency-list nodes (if an adjacency-list representation is used (see Sedgewick, p. 423)). The node conditions, or references to the node conditions can, for example, be put in auxiliary arrays indexed by node number or by making an array of "artificial nodes" an array of records which includes the node conditions or the references to them (if an adjacency-list representation is used (see Sedgewick, pp. 423 and 421)).

In some of the embodiments, ascertaining whether the status message pertains to a lower-level service element connected to the higher-level service element includes testing the edge condition associated with the link to the lower-level service element. The message is only then propagated downwardly along this edge if the edge condition is fulfilled. This means that, if there is no link with a fulfilled edge condition directed downwardly from a certain service element considered, the downward propagation of the status message is terminated at this service element. If there is no other service element in the entire service-element graph at which the status message is pending and from which it can further be downwardly propagated, the downward propagation of the message is globally terminated.

In other embodiments, the, or some of the, edge conditions are implemented as conditions associated with the nodes to which the respective links lead, i.e. as node conditions. The message is only then propagated downwardly along an edge to the connected lower-level node if the node condition at the lower-level node is fulfilled.

As mentioned above, in some of the embodiments, there is not only one high-level service element which serves as an entry point for the status messages, but several service elements that are typically at the same hierarchic level and form parallel entry points. In these embodiments, the status messages are initially directed to all service elements forming such entry points. Since there is no link leading to these entry points from a higher level, conditions are associated with these entry point service elements. Hence, these conditions are node conditions. They are tested when a status message is directed to the associated entry point. The message only enters the graph at this entry point if its node condition is fulfilled. As a consequence, the action of testing edge conditions, and, if applicable, downwardly propagating the status message only commences at those entry points whose node conditions are fulfilled.

In some embodiments, the downward-propagation decisions are partly or completely taken on the basis of the original status message, as they are received from the agents. In other embodiments, however, a preprocessing of the status messages is carried out before they are directed to the entry point or points of the service-element graph, and the downward-propagation decisions are, at least partly, taken on the basis of data added to the status message as a result of the preprocessing. The preprocessing includes analyzing the status message, and, based on this analysis, adding attributes to the status message that are related to information contained in the original status message. The attributes, for example, are indicative of the service element or elements the status message pertains to. The down-propagation decisions, i.e. the actions of ascertaining whether the status message fulfills node and/or edge conditions, are then based on these attributes. This facilitates the downward propagation of the status messages.

As mentioned in the background section, in the prior art a service-element identifier is typically assigned to each service element, and all status messages carry with them a service-element identifier indicating which service element the message is destined for. This normally means that the service model has already to be known when the agents of the monitored objects (which generate the status messages) are configured. Similarly, when the service model is modified, the configuration of the agents (in particular that part of the configuration which defines the service-element identifier to be put in the status messages) has to be adapted to the modified model. However, there is a desire to instrument the status messages (i.e. to arrange the agents to generate status messages) already in an early phase when the service model has not yet been defined. Hence, the use of service-element identifiers requires a great deal of pre-planning of the service model, it is therefore an obstacle to an evolutionary development (also called "rapid prototyping") of the service model. Furthermore, it is arduous to adapt and reinstall or update the agents of the monitored objects each time the service model has been modified.

By contrast, in the embodiments all the status messages are initially either directed to the top of the service-element graph, i.e. to its root, or to a few highest-level service elements just below the root. This eliminates the need to include in a status message a service-element identifier referencing the specific service-element the message is destined for. Accordingly, in the embodiments, the status messages either have no service-element identifier at all, or only a "high-level identifier" which indicates the high-level entry point or points to which all the status messages are directed. This means that either nothing, or only the entry point, has to be defined at the time when the agents are installed. The detailed service model can be defined, extended, modified and refined at a later stage in an evolutionary process. The fact that the status messages are not directed to the service elements for which they are destined by means of a service-element identifier obviates the need to permanently adapt the status-message-producing agents in such an evolutionary process. Rather, the mapping of the status messages to the service elements for which they are destined is achieved by the conditions associated with the service model, as explained above.

A further issue with regard to the mapping of status messages to service elements in the prior art is that there is usually only one service-element identifier per service element. However, a status message often influences more than one service element. One known solution is to provide the status messages concerned with more than one service-element identifier. However, this increases the problems mentioned above. Another known solution is to create an additional element in the service model which has only the task to propagate a status change represented by the status message to the several service elements influenced by it; the status message is then only directed to this additional element. However, this solution renders the service model complicated.

By contrast, in the embodiments the status messages may be mapped to several service elements without a need to carry service-element identifiers of these elements or to introduce additional elements in the service model. In the embodiments, a mapping of status messages to more than one service element is achieved by defining the edge and node conditions associated with the service-element hierarchy such that the propagation path of the status messages is branched so that they are propagated to the several service elements concerned.

The conventional status-message mapping by means of service-element identifiers has good scaling behavior; for example, doubling the service model (e.g. by adding a partial service-element graph comparable in size with the existing one) would not require additional performance, if the conventional identifier-based mapping is used. In another (conceivable) solution, however, in which message attributes or the message itself are tested at each service element, the required performance to map the messages would be doubled. In the embodiments, however, adding a new top-level element with the new partial graph below it would add only one additional test at the new top-level element (assuming that the message does not pertain to the new partial graph). Accordingly, the scaling behavior of the downward-propagation mapping used in the embodiments is nearly as good as in conventional identifier-based mapping.

Some of the embodiments of the computer program product with program code for performing the described methods include any machine-readable medium that is capable of storing or encoding the program code. The term "machine-readable medium" shall accordingly be taken to include, for example, solid state memories and, removable and non removable, optical and magnetic storage media. In other embodiments, the (computer program) product is in the form of a propagated signal comprising a representation of the program code, which more and more becomes the usual way to distribute software. The signal is carried on an electromagnetic wave, e.g. a radio wave transmitted over a copper cable or through the air, or a light wave transmitted through an optical fiber. The program code may be machine code or another code which can be converted into machine code, such as source code in a multi-purpose programming language, e.g. C, C++, Java, C#, etc. The embodiments of a server computer include commercially available general-purpose computers programmed with the program code.

FIG. 1: Managed IT Infrastructure:

Returning now to FIG. 1, it illustrates an exemplary managed IT infrastructure 1. The IT infrastructure 1 is a (sub-)network connected to the Internet 2 and includes several end systems (or hosts) connected with one another and the Internet 2 by means of transmission media (e.g. cables) and network interconnect devices, such as routers 3. The exemplary end devices are: (i) an ERP database server 4 ("ERP" means "Enterprise Resource Planning"), (ii) an ERP user-interface (UI) server 5, (iii) three ERP user interfaces 6.1, 6.2, 6.3, (iv) four exchange servers 7.1, 7.2, 7.3, 7.4, and (v) a management server 8 with a management user interface 9. Two disk drives 10.1, 10.2 are associated with the ERP database server 4. The end systems host different applications; the ERP database server 4 and the ERP UI server 5 host parts 11.1, 11.2 of an SAP® system, and the exchange servers 7.1 to 7.4 host an exchange application 12.1 to 12.4, for example Microsoft® Exchange®. All managed network elements (i.e. all network elements except the management server 8) are equipped with a management agent 13 which is a remotely running program able to collect and send management information about the associated network element and/or application, either asynchronously or on request, to the management server 8, and, in certain cases, to manipulate the associated network element or application upon a request from the management server 8.

The management server 8 hosts a management platform 14 which will be described in more detail in connection with FIG. 6. In the framework of the management platform 14, a service model 15 of the IT infrastructure 1 is defined. The service model 15 has a structure of a graph; it is thus represented by a graph data structure in primary and/or secondary memory of the management server 8. One of the management platform's tasks is to request messages and receive the requested messages from the agents 13, or to receive unrequested (i.e. asynchronous) messages from them, map these messages to one or more elements of the service model 15, and, finally, perform a management activity based on the mapped message, for example, change the status of the service element to which the message has been mapped, propagate the status change upwardly to service elements depending on the element to which the message has been mapped, display in the management UI 9 that a critical change of a service element has occurred, cause an alarm, enter status information into metric values indicative of compliance with service level agreements (SLAs), e.g. a value indicative of "Quality of Service", etc.

Figure 2:
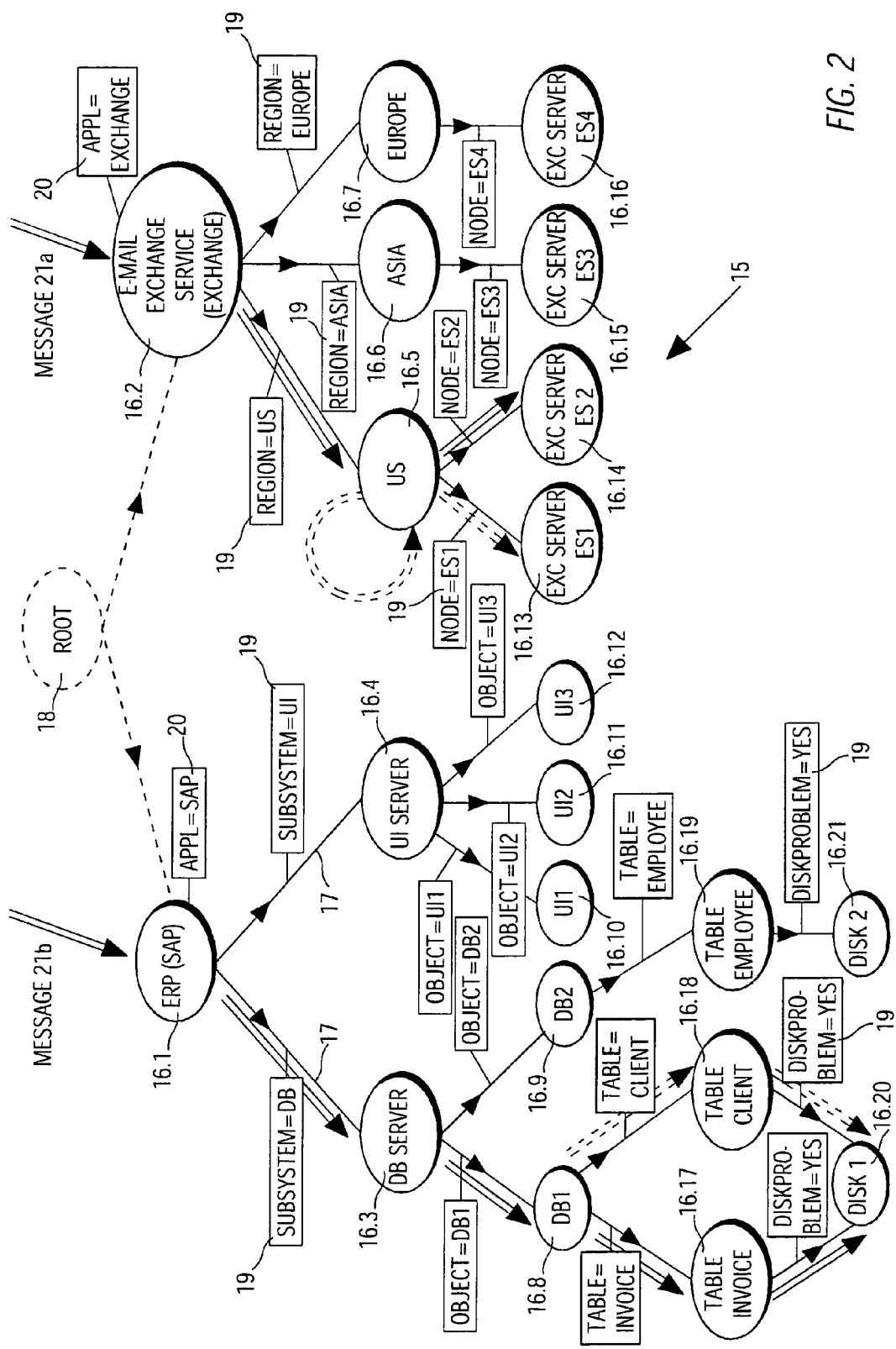
FIG. 2 is an exemplary service model based on the IT infrastructure of FIG. 1.

FIG. 2: Service Model:

FIG. 2 is a representation of an exemplary service-element graph, or service model, 15 of the exemplary IT infrastructure 1 of FIG. 1. In the management server, this graph, for example, may be represented by an adjacency-list or adjacency-matrix representation, as explained above. The nodes of the graph 15 are service elements 16, and the graph's edges represent dependency links 17 between the service elements 16. The links 17 are directed; in the example of FIG. 2 the link direction (which is illustrated by arrows in FIG. 2) is directed opposite to the actual dependency direction. In FIG. 2, higher-level service elements 16 are drawn above the lower-level service elements 16 on which they depend; therefore, the links 17 are directed downwardly.

Some of the service elements 16 correspond to network elements of FIG. 1, but not all network elements are necessarily represented in the service model 15. For example, the routers 3 of FIG. 1 are not expressly represented. Of course, a failure of a non-represented network element, such as a router 13, may affect a represented service element 16. On the other hand, the service model 15 includes logical service elements which are not direct representations of network elements, but are logical entities based on them.

The service model 15 has two highest-level service elements, an ERP (SAP) service 16.1 and an E-mail-exchange service 16.2. The ERP service 16.1 has two children, Database server (DB server) 16.3 and User-interface server (UI server) 16.4. The E-mail exchange service 16.2 has three children, the regions US 16.5, ASIA 16.6 and EUROPE 16.7. The DB server 16.3 has two children, DB1 16.8 and DB2 16.9. The UI server 16.4 has three children, UI1 16.10, UI2 16.11 and UI3 16.12. The region US 16.5 has two children, Exchange server ES1 16.13 and Exchange server ES2 16.14. The regions ASIA 16.6 and EUROPE 16.7 have one child each, exchange server ES3 16.15 and ES4 16.16. DB1 16.8 has two children, TABLE INVOICE 16.17 and TABLE client 16.18, and DB2 16.9 has one child, TABLE Employee 16.19. Finally, the service elements' TABLE INVOICE 16.17 and TABLE Client 16.18 have one common child, DISK1 16.20, and TABLE Employee 16.19 has one child, DISK2 16.21. The service elements DB Server 16.3, UI server 16.4, the Exchange servers ES1 to ES4, 16.13-16.16, and DISK1 16.20 and Disk 2 16.21 partly correspond to the physical network elements 4, 5, 7.1 to 7.4, 10.1 and 10.2 of FIG. 1. For example, the servers have a logical component, a server process, hosted on the physical servers. The remaining service elements 16 of FIG. 2 are logical elements.

All service elements 16 can be reached along the directed links 17 starting from the highest-level elements 16.1, 16.2. Although the links from DB1 16.8 to DISK1 16.20 via 16.17 and 16.18 form a loop, they are directed in parallel from DB1 16.8 to DISK1 16.20, so that there is no directed cycle (in other words, a "round trip" from DB1 16.8 to DISK1 16.20 and back to DB1 16.8 is excluded).

In some of the embodiments, the service model 15 has only one entry point, which need not represent a service element, but may be a virtual node, the only purpose of which is to serve as a unique entry point to the service model 15. In FIG. 2, this alternative is illustrated by a root 18 linked to the highest-level service elements 16.1 and 16.2.

Link conditions 19 are associated with the links 17. Furthermore, in embodiments without a root 18, node conditions 20 are associated with the highest-level nodes 16.1, 16.2. In FIG. 2, the link and node conditions 19, 20 are illustrated by rectangular boxes. A condition 19, 20, for example, may have the form "variable operator value". The operator may be an equality or inequality operator or, if an order relation is defined on the data to be tested, a ">" or a "<" relation, etc. Composite conditions are also feasible. If a link condition 19 is true for a certain message, the message is downwardly propagated via the link 17 with which the condition 19 is associated to a downward service element 16 connected by the link 17; if it is not true, the message is not propagated via this link 17. If a node condition 20 is true for a certain message, the message is lead to the service element 16 with which the node condition 20 is associated; if it is not true, the message is not lead to that service element 16 (which means that, if the service element is one of the highest level service elements 16.1 and 16.2, the message does not enter the service model 13 at this service element).

In embodiments with a root 18, the role of the node conditions 20 at the highest-level service elements 16.1, 16.2 is taken by corresponding link elements associated with the links between the root 18 and the highest-level service elements 16.1 and 16.2.

In other embodiments, lower-level service elements may also have node conditions associated, which replace the link conditions.

Figures 3A, 3B:
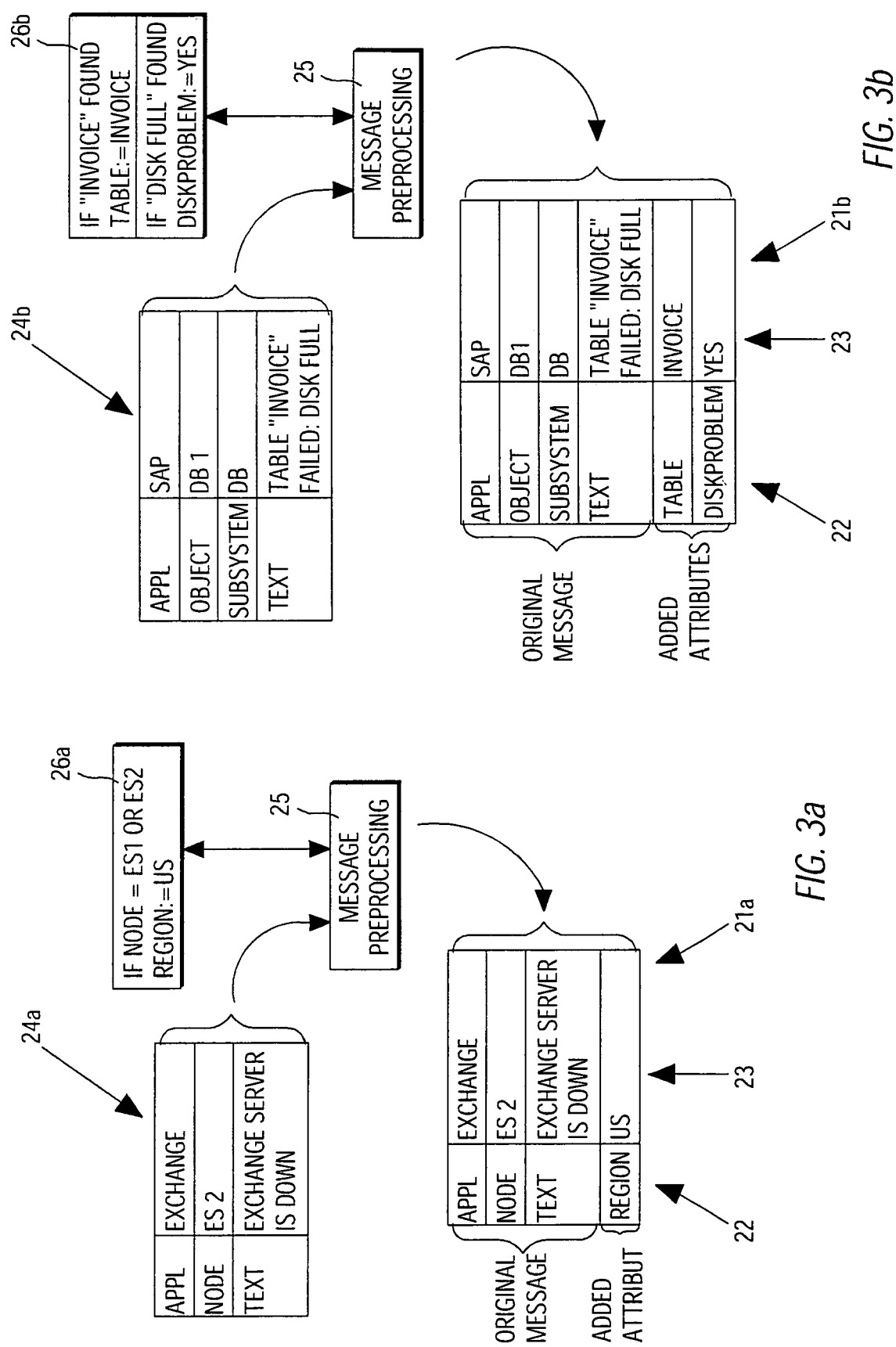
FIG. 3 illustrates message preprocessing considering two exemplary messages.

FIGS. 2 and 3: Message Mapping:

The mapping of messages to service elements by downwardly propagating the messages in the service model 15 is now illustrated by means of two exemplary messages 21*a*, 21*b* shown at the lower part of FIGS. 3*a* and 3*b*. As mentioned above, such messages 21 are synchronously or asynchronously produced by the agents 13 (FIG. 1) of managed network elements. As will be explained later in connection with FIG. 3, the messages 21 need not be the originally produced versions. Rather, the representation of the information contained in the messages may be changed, and further information may be added, in a preprocessing procedure. For example, information contained in the form of plain text may be extracted and added to the original message in the form of an attribute value. Furthermore, information about the structure of the service model may be added, depending on information contained in the original message. The resulting messages are called "preprocessed messages". The exemplary messages 21*a* and 21*b* used to illustrate the process of downward propagation are such preprocessed messages. The first preprocessed message 21*a* has four attributes 22, "APPL", "NODE", "TEXT", and "REGION"; the values 23 of these attributes are "EXCHANGE", "ES2", "EXCHANGE SERVER IS DOWN ", and "US". The second exemplary message 21*b* has six attributes 22, "APPL", "OBJECT", "TEXT", "SUBSYSTEM", "TABLE", and "DISKPROBLEM". The corresponding attribute values 23 are "SAP", "DB1", "TABLE "INVOICE" FAILED: DISK FULL", "DB", "INVOICE" and "YES".

In embodiments without a virtual root 18, initially the node conditions 20 of all entry points 16.1, 16.2 are tested for all messages. For example, the node conditions 20 of the entry points 16.1, 16.2 test whether the attribute APPL has the value SAP (for entry point 16.1) or EXCHANGE (for entry point 16.2). For the first exemplary message 21*a*, only the node condition 20 at the entry point 16.2 is fulfilled; hence, the service model 15 is only entered by the first message 21*a* at the EXCHANGE entry point 16.2, but not at the SAP entry point 16.1.

In other embodiments with a virtual root 18, all messages 21 are entered at the root 18, but are only downwardly propagated to the next-level service elements 16.1 and/or 16.2 if link conditions, corresponding to the node conditions 20 of embodiments without root 18, are fulfilled. The result is the same as in embodiments without root 18, i.e. the first exemplary message 21*a* is only propagated to service element 16.2, but not to service element 16.1.

Then, message 21*a* is tested against three link conditions 19 associated with links 17 connecting the highest-level service element 16.2 with three service elements 16.5, 16.6 and 16.7 at the next-lower level. These link conditions 17 test whether the attribute REGION of the message 21*a* has the value US, ASIA or EUROPE. Since only the link condition "REGION=US" is fulfilled, the message is only downwardly propagated to the US service element 16.5, but to none of the other linked service elements 16.6, 16.7. Now, the message 21*a* is tested against link conditions 19 associated with links 17 connecting service element 16.5 with the next-lower service elements, ES1 16.13 and ES2 16.14. These test whether the attribute NODE has the value ES1 or ES2. Since only the condition "NODE=ES2" is fulfilled, the message is only downwardly propagated via the link 17 with which this condition 19 is associated, to the ES2 service element 16.14, but is not downwardly propagated via the other link 17 to the ES1 service element 16.13. Since there is no further link connecting the ES2 service element 16.14 to another service element, the process of downward propagation is terminated. The service element at which the downward propagation is terminated is the service element for which the message 21*a* is destined. Hence, as a result, the message 21*a* is mapped to the service element for which it is destined. In FIG. 2 the path along which message 21*a* is propagated is illustrated by dual-line arrows.

Technically, the process of downwardly propagating a message means processing the service element graph with the message by starting from the highest-level entry points or the virtual root, traveling along the links in the link direction and thereby visiting all the nodes of the graph, provided that the link condition associated with a link under consideration is fulfilled, and terminating this process if there is no further link or fulfilled link condition.

In the embodiments shown, no unique service-element identifier, or service-element "key", that uniquely identifies the service element for which a message is destined (the "target" service element) is used in the message-mapping process. Hence, the messages 21 do not contain a service-element identifier. Rather, in order to enable a message 21 to be uniquely mapped, it is sufficient that the whole set of attributes 22 of a message 21, or a subset of them, uniquely identifies the target-service element in a composite manner. In the language used in connection with data modeling, entities which have no key attribute, such as the present service elements, are called "weak entities" and such a set of attributes that can uniquely identify a weak entity is also called a "partial key" (see, for example, R. Elmasri: Fundamentals of Database Systems, $3^{rd}$ edition, 2000, pp. 50, 59 and 60).

In certain circumstances, it may, however, be desired to propagate a message 21 to more than one lower-level service element 15. For example, in FIG. 2, it might be desired to map message 21*a* to both ES1 16.13 and ES2 16.14. Such a "branching" of a message 21 is achieved by defining the link conditions 19 in a way which does not limit the downward propagation to only one downward link 17. For example, if the link conditions 19 associated with the two links 17 connecting US 16.5 with ES1 16.13 and ES2 16.14 are replaced by the condition "REGION=US" (equal for both links), the message 21*a* is propagated to both ES1 16.13 and ES2 16.14. In other embodiments, branding of a message 21 is achieved by using multi-valued attributes in the messages.

Downward propagation of the message 21 is terminated at those service elements 16 which either have no downward link 17 or have no downward link 17 with a fulfilled link condition 19. Hence, downward propagation of the first exemplary message 21*a* is terminated at service element ES2 16.14, or, in the example with the message branching, at both service elements ES1 16.13 and ES2 16.14.

The purpose of the downward-propagation procedure is to map a message 21 to one or more service elements 16. In most of the embodiments, the mapping is defined such that a message 21 is mapped only to this service element 16 (or to those service elements 16) at which the downward propagation is terminated. In the example mentioned, the first exemplary message 21*a* is then only mapped to service element ES2

16.14 (or, in the example with branching, it is only mapped to service elements ES1 16.13 and ES2 16.14). Of course, not only the end node of the downward propagation to which the message is mapped may be affected by a status change indicated by the message, but the status change may also have an impact to the status of further service elements above them in the service-model hierarchy. Nevertheless, in most of the embodiments, the messages are not additionally mapped to those affected higher-level service elements. Rather, the status of the lower-level service element to which the message has been mapped (but not the message itself) is then upwardly propagated from it to the affected higher-level service elements, for example, as described in US 2002/0138638 A1 mentioned at the outset.

In alternative embodiments, however, a message is not only mapped to the end nodes of the downward propagation, but also to some or all nodes lying above it on the propagation path. For example, a message 21a may also be mapped to the intermediate node US 16.5, as illustrated by a dashed dualline arrow starting and ending at 16.5. The decision as to whether a message is also to be mapped to an intermediate node, or whether it is only to be handed over to the next lower-level nodes for which the link conditions are fulfilled, may be based on additional node conditions associated with the intermediate nodes.

Downward propagation of the second exemplary message 21b is also illustrated by dual-line arrows in FIG. 2. As can be seen, message 21b only fulfills the node condition "APPL=SAP" associated with service element 16.1, and therefore enters the service model 15 only at this service element 16.1. Then, it is downwardly propagated to service elements 16.3, 16.8, 16.17 and 16.20, as it only fulfills the corresponding link conditions "SUBSYSTEM=DB", "OBJECT=DB1", "TABLE=INVOICE" and "DISKPROBLEM=YES".

As mentioned above, the graph representing the service model 15 forms a loop including the service elements 16.8, 16.17, 16.18 and 16.20. Although the fact that the links from 16.8 to 16.20 are directed in a parallel manner prevents a message from being indefinitely propagated in a cycle, there are two different paths from 16.8 to 16.20, the first one via service element 16.17 and the second one via service element 16.18. For the sake of illustration let us assume now a particular embodiment in which the message is branched at 16.8 and downwardly propagated to both service elements 16.17 and 16.18 (for example, by using link conditions at the links from 16.8 to 16.17 and 16.18 which branch the message 21b, as explained above for the first exemplary message 21a). The two messages would then be further propagated to one and the same service element, 16.19. In order to prevent such a "doubling" of messages, in some embodiments, a bookkeeping of the messages received at each node is performed, and if it is observed that a message has been "doubled", only one of the "doubled" messages is retained and further used. For example, if the messages are referenced by a message identifier, all nodes memorize the message identifiers of the messages already received, and discard an already memorized reference to a message. In FIG. 2, the branching of message 21b at service element 16.8 and the downward propagation of the two messages to service element 16.19 is illustrated by additional dashed dual-line arrows. The discarding of the "doubled message" takes place at service element 16.19.

In the embodiment of FIG. 2, although the mapping of a message 21 involves testing composite conditions, the individual conditions 19, 20 tested at each stage of the downward propagation may be single conditions. This is due to the fact that the composite condition to be tested in the mapping procedure is not processed at once, but rather in several stages when the service-element graph 15 is traversed. Of course, such single conditions are not mandatory; rather, composite conditions may also be used as link or node conditions, for example, conditions constructed by "AND", "OR" and/or "NOT" from single conditions.

Once a message 21 has been mapped to the target service element or elements 16, the actual management activity based on the mapped message will commence. For example, if the message indicates that a failure of the target-service element has occurred, the status of the target-service element is changed, its status change is upwardly propagated to service elements depending on the target-service element, the status changes are displayed in the management UI 9, an alarm is caused, the status change or failure information is entered into metric values indicative of compliance with SLAs, etc.

FIG. 3: Message Preprocessing:

FIG. 3 illustrates message preprocessing considering the two exemplary messages already mentioned above. Although the original messages 24a, 24b produced by the agents 13 (FIG. 1), in principle, contain all the information needed to uniquely map the messages 24a, 24b to service elements 16, the information is typically not represented by them in a form optimal for testing conditions as described in connection with FIG. 2. Two examples of original messages are shown in FIG. 2, 24a and 24b. For example, the original messages 24a, 24b may not contain references to certain logical service elements 16. For instance, original message 24a does not expressly include information identifying the REGION to which the message pertains. Furthermore, certain information to be tested may only be represented by them in an unstructured manner, for example, in the form of text. For instance, original message 24b indicates that the TABLE to which the message pertains is INVOICE, but this information is represented in the form of text, together with other text ("TABLE "INVOICE" FAILED: DISK FULL").

In some embodiments a message preprocessing (symbolized by box 25 in FIG. 3) is carried out before the downward-propagation process. In the preprocessing 25 attributes 22 are added to the original messages 24, so that all the information to be tested in order to map the message to the target-service element is represented in the message in the form of attribute values. For example, during preprocessing of the first exemplary original message 24a, the value ES2 of the attribute NODE is read from original message 24a. An attribute-defining rule 26a defines which REGION attribute value corresponds to node ES2. According to the service model 15 (FIG. 2), the region attribute US depends on nodes ES1 and ES2. Hence, the attribute-defining rule 26a tests whether the NODE attribute is ES1 or ES2, and if the outcome is positive, the new REGION attribute is set to the value US. Hence, service-model information and information contained in the original message 24a is combined to create a new attribute; here the new REGION attribute with the value US is appended to the original message 24a to form the preprocessed message 21a.

Similarly, during the preprocessing of the second exemplary original message 24b, the text contained in it is parsed. If, according to attribute-defining rules 26b the sub-strings "INVOICE" and "DISK FULL" are found, new attributes TABLE and DISKPROBLEM are set to the values INVOICE and YES, and are appended to original message 24b to form the preprocessed message 21b. Of course, the attribute-defining rules 26 reproduced in FIGS. 3a and 3b are only fragments of the complete rules, rules which will, for example, test for the occurrence of other values in the NODE attribute, or the occurrence of other sub-strings in the parsed text, than the ones shown in FIGS. 3a and 3b.

In further embodiments, both the "attribute creation", according to FIG. 3a and the "attribute extraction" according to FIG. 3b are combined. In other words, some of the additional attributes are obtained by combining service-model information and message information, and others are extracted from unstructured information in the messages, such as text.

In some of the embodiments, original messages (rather than preprocessed messages 21) are processed through the service element graph 15, in analogy to what has been explained in connection with FIG. 2. However, testing conditions are then more complicated, since, in the example of first original message 24a, the missing attribute REGION has to be inferred from the NODE attribute each time REGION is tested, and, in the example of second original message 24b, text has to be parsed each time a condition based on text information is evaluated.

Figure 4:
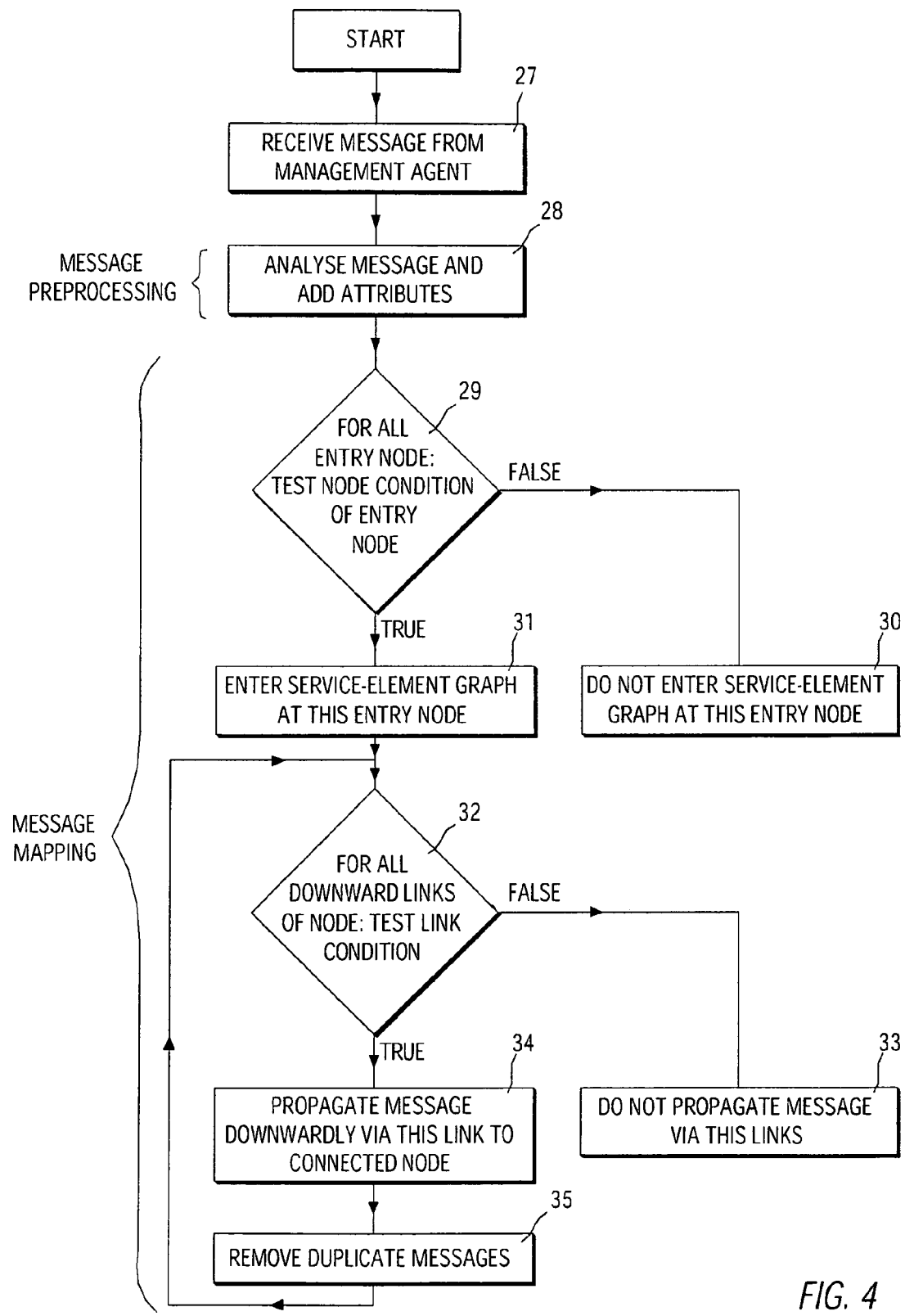
FIG. 4 is a flow diagram of a message-mapping process.

FIG. 4 Message Preprocessing and Mapping Process:

FIG. 4 is a flow diagram of the message preprocessing and mapping process described so far. A management message from a management agent is received at 27. At 28, the message is preprocessed, e.g. it is analyzed, and attributes are added to it, as described in connection with FIG. 3. In embodiments without a root 18, it is then tested at 29 for all nodes acting as an entry point (called "entry nodes") whether the node condition associated with them is fulfilled. If the node condition is not fulfilled at a certain entry node, the service-element graph is not entered at this entry node, as indicated by box 30. If, however, the node condition of an entry node is fulfilled, the service-element graph is entered at this entry node, at 31. It is then tested at 32 for all downward links of the node under consideration whether the link condition associated with the downward link is fulfilled. If the link condition of a certain link is not fulfilled, the message is not propagated via this link, as indicated by box 33. However, if the link condition is fulfilled, the message is downwardly propagated via this link to the lower-level node connected by this link at 34. At 35, it is ascertained, at the lower-level node, whether the message has already been received, i.e. is a "duplicate message", and if so, it is removed. This description of the downward processing is recursive; i.e., the activities 32 to 35 are repeatedly carried out to further propagate the message downwardly. The downward propagation stops at 32 if there is no downward link to be processed any more, or at 33, if there is no fulfilled link condition any more. In embodiments with a virtual root 18 acting as the entry node, the activities 29 and 30 may be omitted, the service-element graph is then entered at the root, at 31.

Figure 5:
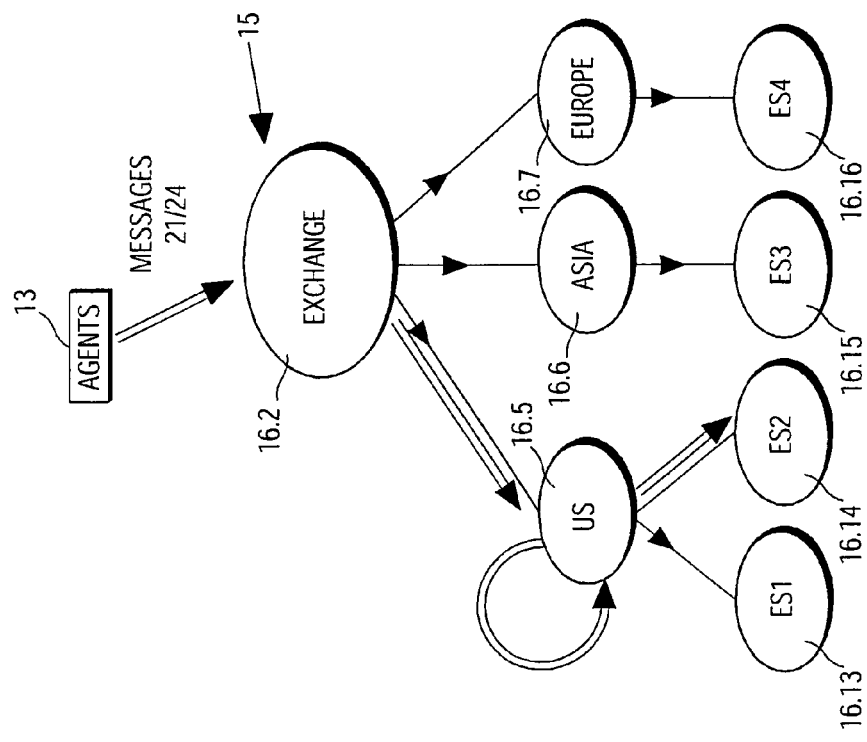
FIG. 5 illustrates how messages may be handled when the service model is still undergoing an evolution.
Figure 5:
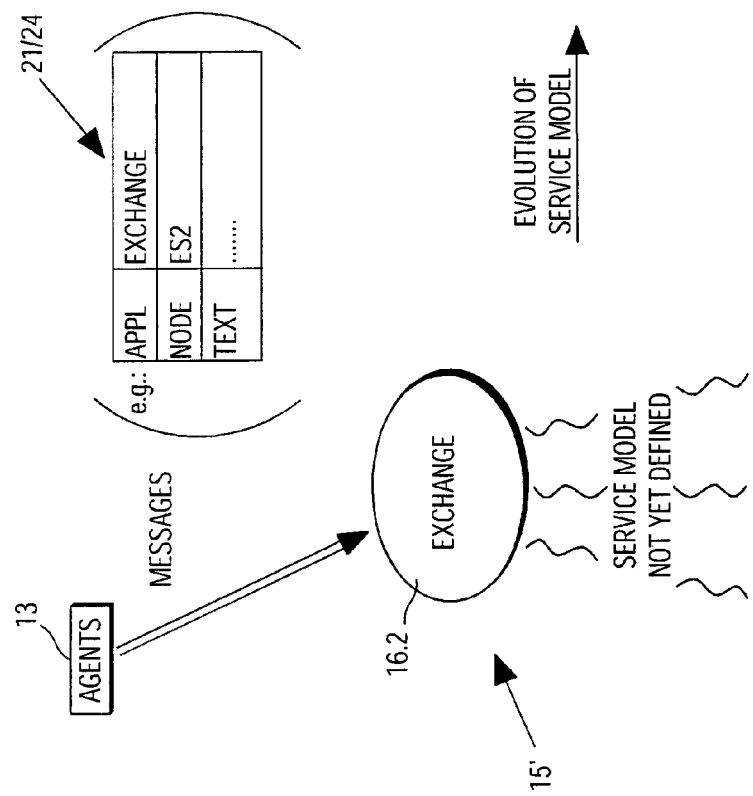

FIG. 5: Evolution of Service Model:

FIG. 5 illustrates how messages 21 may be handled when the service model 15 is still undergoing an evolution. At the left-hand side of FIG. 5, an exemplary case is shown in which the service model has not yet been defined for a certain application, here the EXCHANGE application 16.2, as may be the case in the beginning of a development phase. In the example shown, the not-yet-defined service model 15' only consists of the highest-level service element 16.2.

During an evolutionary process, the not-yet-defined service model 15' may be defined, or an already defined service model may be modified. At the right-hand side of FIG. 5, an exemplary result of such a service-model evolution is shown, which corresponds to the EXCHANGE branch of FIG. 2 (and the above-mentioned embodiment in which message 21a (FIG. 3a) is not only mapped to the end node 16.14 of the propagation path, but also to the intermediate node 16.5).

Although, at the beginning of the evolution, the service model 15' is not yet defined below the highest-level service element 16.2, the agents 13 of devices belonging to the not yet defined EXCHANGE service may already be instrumented to produce messages referring to the EXCHANGE service. The messages are then directed to the highest-level service element 16.2 (the message may be in the original or a preprocessed form, they are therefore denoted by "21/24" in FIG. 5). Already at this early stage of the service-model evolution, the instrumentation of the agents 13 may hence be made in a final form. Due to the fact that the messages are later downwardly propagated and that no service-element identifier needs to be contained in the messages to perform the mapping, no changes have later to be made to the structure and/or format in which the original messages are produced, and hence no changes have later to be made to the instrumentation of the agents 13, to adapt them to evolutionary extensions and modifications of the service model.

Of course, in the rudimentary state of the service model 15' illustrated at the left-hand side of FIG. 5, the messages directed to the entry node 16.2 are not downwardly propagated, since the service elements below the entry node 16.2 are not yet defined. Rather, all messages pertaining to the EXCHANGE service (i.e. messages whose APPL attribute has the value EXCHANGE) are only mapped to the entry node 16.2.

Only later, when the service model has evolved, for example, to the service model 15 at the right-hand side of FIG. 5, the messages are downwardly propagated in the service model 15 and mapped to lower-level service elements, for example to the service elements 16.5 and 16.14 as described above. Preprocessing rules 26 (FIG. 3) will also evolve with the evolution of the service model. However, the instrumentation of the agents 13, i.e. the rules according to which the agents 13 produce messages, need not be changed during the evolution. By contrast, in a mapping based on service-element identifiers, the agent instrumentation would have to be adapted to such an evolution, for example, since the (logical) service element 16.5 is not defined in the early stage of the evolution and hence would not yet have a service-element identifier; only after service element 16.5 has been defined, the identifier referring to it could be included in the message-generation rules, which would require a reconfiguration of the agents.

Figure 6:
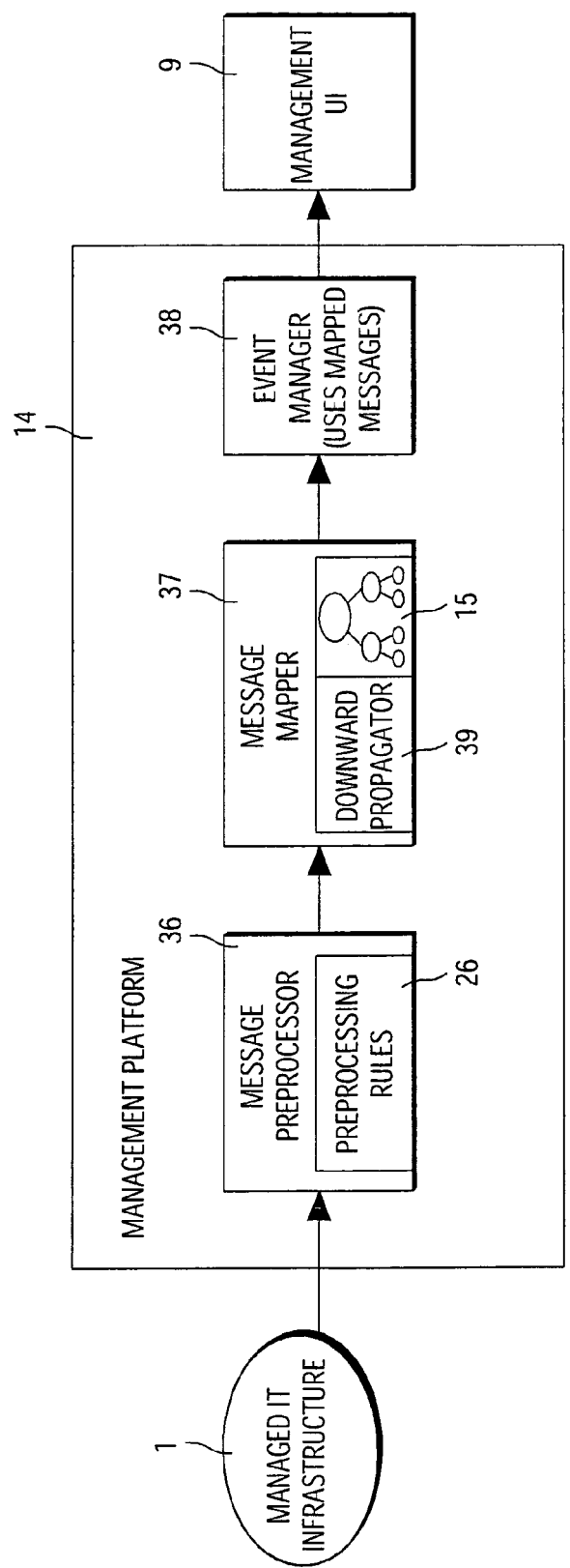
FIG. 6 is a high-level architecture diagram of a part of a management platform arranged to map management messages to service elements.

FIG. 6: Management Platform:

FIG. 6 is a high-level architecture diagram of the part of the management platform 14 (FIG. 1) concerned with the processing of the messages. The management platform 14, which is hosted by the management server 8 (FIG. 1) includes a message preprocessor 36, a message mapper 37 and an event manager 38. The management platform 14 receives management messages from the agents 13 (FIG. 1) in the managed IT infrastructure 1. The message preprocessor 36 performs message preprocessing 25 (FIG. 3) according to preprocessing rules 26, as explained in connection with FIG. 3. The message mapper 37 performs the downward propagation of the preprocessed messages in the service model 15, as described in connection with FIG. 2; it includes a downward propagator 39 and stores a representation of the service model 15. As a result, the messages are mapped to one or more service elements. The event manager 38 further processes the events represented by the messages based on the outcome of the event-mapping procedure; for example, it changes the status of a service element to which a message has been mapped, propagates the status upwardly to service elements depending on this element, displays that status changes of service elements have occurred in the management UI 9, causes an alarm, enters status information into values indicative of compliance with SLA's, etc.

In some embodiments, the message preprocessor 36, message mapper 37, event manager 38, downward propagator 39 are software components separated from each other and from other software components, in other embodiments they are combined with each other and other software items. The terms "message preprocessor", "message mapper", "event manager" and "downward propagator" are hence functional terms, and their box-like representations in FIG. 6 are functional representations, which do not necessarily imply that separate software components, solely devoted to message preprocessing, message mapping, event managing, and downward propagation are provided.

Figure 7:
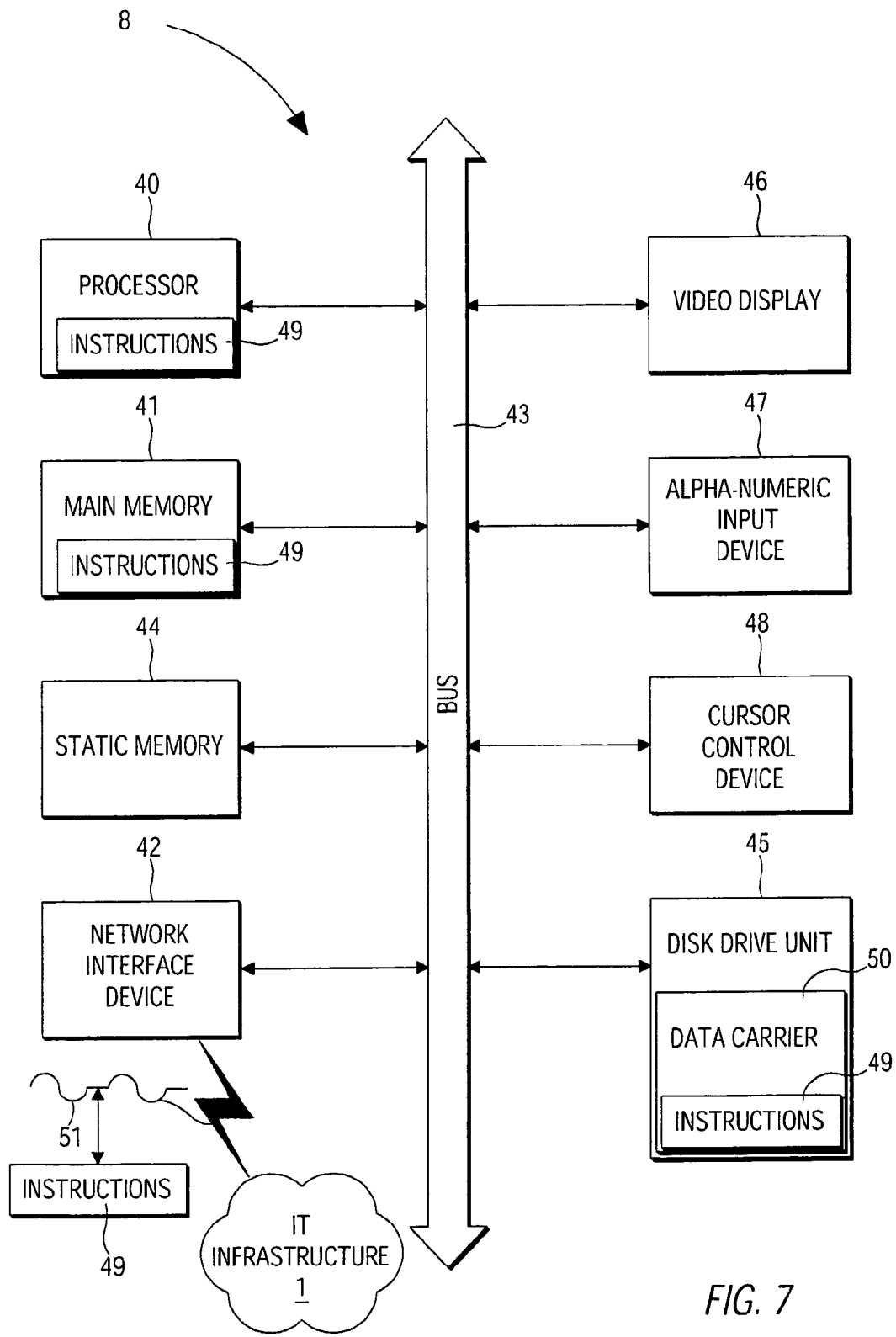
FIG. 7 is a diagrammatic representation of a management server.

FIG. 7: Management Server:

FIG. 7 is a diagrammatic representation of the management server 8 (FIG. 1) within which a set of instructions, for causing the management server to perform any of the methodologies discussed herein, may be executed. The management server 8 includes a processor 40, a main memory 41 and a network interface device 42, which communicate with each other via a bus 43. Optionally, it may further include a static memory 44 and a disk drive unit 45. A video display 46, an alpha-numeric input device 47 and a cursor control device 48 may form the management user interface 9 (FIG. 1). The network interface device 42 connects the management server 8 to the IT infrastructure 1 (actually, the management server 8 also is a part of the IT infrastructure 1). A set of instructions (i.e. software) 49 embodying any one, or all, of the methodologies described above, resides completely, or at least partially in or on a machine-readable medium, e.g. the main memory 41 and/or the processor 40. A machine-readable medium on which the software 49 resides may also be a data carrier 50 (e.g. a non-removable magnetic hard disk or an optical or magnetic removable disk) which is part of disk drive unit 45. The software 49 may further be transmitted or received as a propagated signal 51 via the Internet 2 and the IT network 1 through the network interface device 42.

Thus, a general purpose of the disclosed embodiments is to provide improved methods and products for mapping status messages elements of an IT-infrastructure-service model.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of mapping status messages of monitored objects to service elements in an IT-infrastructure-management system, the service elements and their dependencies being represented by an element graph having representations of directed links between service elements, thereby defining representations of higher-level and lower-level service elements, the mapping method being performed on the element graph prior to the status messages being actually transmitted and comprising:
   directing a status message to a representation of at least one higher-level service element;
   ascertaining, at the representation of the higher-level service element, whether the status message pertains to a lower-level service element connected with the higher-level service element;
   downwardly propagating the status message to said lower-level service element in response to a positive outcome by said ascertaining step.

2. The method of claim 1, wherein, before the status message is directed to the representation of the at least one higher-level service element, the status message is analyzed, and representations of attributes are added to the status message related to information contained in the status message, wherein said ascertaining step is performed on the basis of the representations of the attributes added to the status message.

3. The method of claim 1, wherein at least some of the representations of the service elements are logical service elements.

4. The method of claim 1, wherein a representation of an edge condition is associated with a link connecting the a representation of at least one higher-level service element with a representation of a lower-level service element, and wherein the representation of the edge condition is tested as part of said ascertaining step.

5. The method of claim 1, wherein representation of a node condition is associated with a representation of the at least one higher-level service element, and wherein the representation of the node condition is tested as part of said ascertaining step.

6. The method of claim 1, wherein the representations of the lower-level service elements are arranged in more than one hierarchical level, and wherein representations of the actions of ascertaining and downwardly propagating are repeatedly carried out downwardly from level to level.

7. The method of claim 6, wherein, as part of said ascertaining step, for a representation of a service element on a higher hierarchical-level, at least one condition is tested for each representation of a service element on a lower hierarchical-level connected with the service element on the higher hierarchical-level, and wherein the downward propagation of the status message is terminated if no condition for propagating the status message to a representation of a service element on the lower hierarchical-level is fulfilled.

8. The method of claim 1, wherein the element graph is extended by adding representations of further service elements without adapting the status messages of the representation of the monitored objects to the representation of the service elements added.

9. A method of mapping status messages of monitored objects to service elements in an IT-infrastructure-management system, the service elements and their dependencies being represented by an element graph having directed links between service elements, thereby defining representations of higher-level and lower-level service elements, the method being performed on the element graph prior to the status massages being actually transmitted and comprising:
   analyzing a status message of a monitored object, and adding representations of attributes to the status message, the added representations of attributes being related to information in the status message;
   directing the status message to a representation of at least one higher-level service element;
   ascertaining, at the representation of the higher-level service element, on the basis of at least one of the representations of the attributes, whether the status message pertains to a lower-level service element connected with the higher-level service element;
   downwardly propagating of the status message to the representation of said lower-level service element in response to a positive outcome by said ascertaining step.

10. The method of claim 9, wherein at least some of the representations of the service elements are logical service elements.

11. The method of claim 9, wherein a representation of an edge condition is associated with a representation of a link connecting the at least one higher-level service element with a lower-level service element, and wherein said ascertaining step includes testing, using a representation of at least one of the attributes, whether the representation of the edge condition is fulfilled.

12. The method of claim 9, wherein a representation of a node condition is associated with the representation of the at least one higher-level service element, and wherein said ascertaining step includes testing, using the representation of at least one of the attributes, whether the representation of the node condition is fulfilled.

13. The method of claim 9, wherein the representations of lower-level service elements are arranged in more than one hierarchical level, and wherein representations of the actions of ascertaining and downwardly propagating are repeatedly carried out downwardly from level to level.

14. The method of claim 13, wherein said ascertaining step includes: for a representation of a service element on a higher hierarchical-level, testing a representation of at least one condition for each service element on a lower hierarchical-level connected with the service element on the higher hierarchical-level, and wherein the downward propagation of the status message is terminated if no condition for propagating the status message to a representation of a service element on the lower hierarchical-level is fulfilled.

15. The method of claim 9, wherein the element graph is extended by adding representations of further service elements without adapting the status messages of the representations of the monitored objects to the representations of the service elements added.

16. An IT-infrastructure-management server arranged to map status messages of monitored objects of the IT infrastructure to service elements, the server including an element graph having representations of directed links connecting representations of service elements, thereby defining representations of higher-level and lower-level service elements, the server being programmed to cause the element graph to perform plural operations and then transmit the status messages, the plural operations including:
   directing a status message to a representation of at least one higher-level service element;
   ascertaining, at the representation of the higher-level service element, whether the status message pertains to a lower-level service element connected with the higher-level service element;
   propagating downwardly the status message to the representation of said lower-level service element in response to a positive outcome of said ascertaining step.

17. An IT-infrastructure-management server arranged to map status messages of monitored objects of the IT infrastructure to service elements,
   the server including an element graph having representations of directed links connecting representations of service elements, thereby defining representations of higher-level and lower-level service elements, the server being programmed to cause the element graph to perform plural operations and then transmit the status messages, the plural operations including:
   analyzing a status message of a monitored object, and add representations of attributes to the status message, the added representations of attributes being related to information contained in the status message,
   directing the status message to a representation of at least one higher-level service element;
   ascertaining, at the representation of the higher-level service element, on the basis of a representation of at least one of the attributes, whether the status message pertains to a lower-level service element connected with the higher-level service element;
   propagating downwardly the status message to the representation of said lower-level service element in response to a positive outcome of said ascertaining step.

18. A computer program product comprising a machine-readable medium with program code stored on it, for carrying out a method, when executed on a computer system, of mapping status messages of monitored objects to service elements in an IT-infrastructure-management system, the service elements and their dependencies being represented by an element graph having representations of directed links between representations of service elements, thereby defining representations of higher-level and lower-level service elements, the program code being arranged to be performed before transmission of the mapping status messages to the service elements and causing the computer system to cause the element graph to:
   direct a status message to a representation of at least one higher-level service element;
   ascertain, at the representation of the higher-level service element, whether the status message pertains to a lower-level service element connected with the higher-level service element;
   downwardly propagating the status message to a representation of said lower-level service element in response to a positive outcome of said ascertaining step.

19. A computer program product comprising a machine-readable medium with program code stored on it, for carrying out a method, when executed on a computer system, of mapping status messages of monitored objects to service elements in an IT-infrastructure-management system, the service elements and their dependencies being represented by an element graph having representations of directed links between service elements, thereby defining representations of higher-level and lower-level service elements, the program code being arranged to be performed before transmission of the mapping status messages to the service elements and causing the computer system to cause the element graph to:
   analyze a status message of a monitored object, and add representations of attributes to the status message related to information contained in the status message,
   direct the status message to a representation of at least one higher-level service element;
   ascertain, at a representation of the higher-level service element, on the basis of the representation of at least one of the attributes, whether the status message pertains to a lower-level service element connected with the higher-level service element;
   propagate downwardly the status message to a representation of said lower-level service element in response to a positive outcome of said ascertaining step.

20. A method of propagating signal carried on an electromagnetic waveform, the method comprising representing a program code for carrying out a method, when executed on a computer system, of mapping status messages of monitored objects to service elements in an IT-infrastructure-management system, the service elements and their dependencies being represented by an element graph having representations of directed links between representations of service elements, thereby defining representations of higher-level and lower-level service elements, the program code being arranged to be performed before transmission of the mapping status messages to the service elements and causing the computer system to cause the element graph to:

direct a status message to a representation of at least one higher-level service element;

ascertain, at the representation of the higher-level service element, whether the status message pertains to a lower-level service element connected with the higher-level service element;

downwardly propagating the status message to the representation of said lower-level service element in response to a positive outcome of said ascertaining step.

21. Apparatus for transmitting a signal carried on an electromagnetic waveform, comprising a source of program code for carrying out a method, when executed on a computer system, of mapping status messages of monitored objects to service elements in an IT-infrastructure-management system, the service elements and their dependencies being represented by an element graph having directed links between service elements, thereby defining representations of higher-level and lower-level service elements, the program code being arranged to be performed before transmission of the mapping status messages to the service elements and causing the computer system to cause the element graph to:

analyze a status message of a monitored object, and add representations of attributes to the status message, the added representations being related to information contained in the status message, direct the status message to a representation of at least one higher-level service element;

ascertain, at the representation of the higher-level service element, on the basis of at least one of the represented attributes, whether the status message pertains to a lower-level service element connected with the higher-level service element;

propagate downwardly the status message to a representation of said lower-level service element in response to a positive outcome of said ascertaining step.

* * * * *

UNITED STATES PATENT AND TRADEMARK OFFICE
CERTIFICATE OF CORRECTION

| | | |
|---|---|---|
| PATENT NO. | : 7,499,984 B2 | Page 1 of 1 |
| APPLICATION NO. | : 10/806431 | |
| DATED | : March 3, 2009 | |
| INVENTOR(S) | : Bernd Gutjahr | |

It is certified that error appears in the above-identified patent and that said Letters Patent is hereby corrected as shown below:

In column 20, line 15, in Claim 4, after "connecting" delete "the".

In column 20, line 20, in Claim 5, after "wherein" insert -- a --.

In column 20, line 50, in Claim 9, delete "massages" and insert -- messages --, therefor.

In column 22, line 57, in Claim 20, after "propagating" insert -- a --.

Signed and Sealed this

Eighteenth Day of August, 2009

David J. Kappos
*Director of the United States Patent and Trademark Office*